United States Patent [19]
Holt et al.

[11] Patent Number: 5,243,518
[45] Date of Patent: Sep. 7, 1993

[54] DOCUMENT SERVICES ARCHITECTURE

[75] Inventors: Charles P. Holt, Williamson; Anthony M. Federico, Webster; Ernest L. Legg, Fairport, all of N.Y.; Gene A. McDaniel, Jr., Palo Alto; Ronald E. Rider, Menlo Park, both of Calif.

[73] Assignee: Xerox Corporation, Stamford, Conn.

[21] Appl. No.: 695,496

[22] Filed: May 3, 1991

[51] Int. Cl.⁵ .................... G06F 15/38; G06G 7/60
[52] U.S. Cl. ................................................. 364/419.1
[58] Field of Search ........................................ 364/419

[56] References Cited

U.S. PATENT DOCUMENTS

| | | | |
|---|---|---|---|
| 4,190,350 | 2/1980 | Donohue et al. | 355/14 R |
| 4,348,739 | 9/1982 | Deaver et al. | 364/900 |
| 4,587,633 | 5/1986 | Wang et al. | 364/900 |
| 4,811,052 | 3/1989 | Yamakawa et al. | 355/14 C |
| 4,918,588 | 4/1990 | Barrett et al. | 364/200 |

OTHER PUBLICATIONS

Vicent Alfieri, "The Best Book of WordPerfect Version 5.0", 1989, pp. 63–80.

*Primary Examiner*—Roy N. Envall, Jr.
*Assistant Examiner*—Ari M. Bai
*Attorney, Agent, or Firm*—Frederick E. McMullen

[57] ABSTRACT

A layered document services architecture facilitating operation and interconnection of electronic printing systems with both resident and non-resident work inputs.

12 Claims, 14 Drawing Sheets

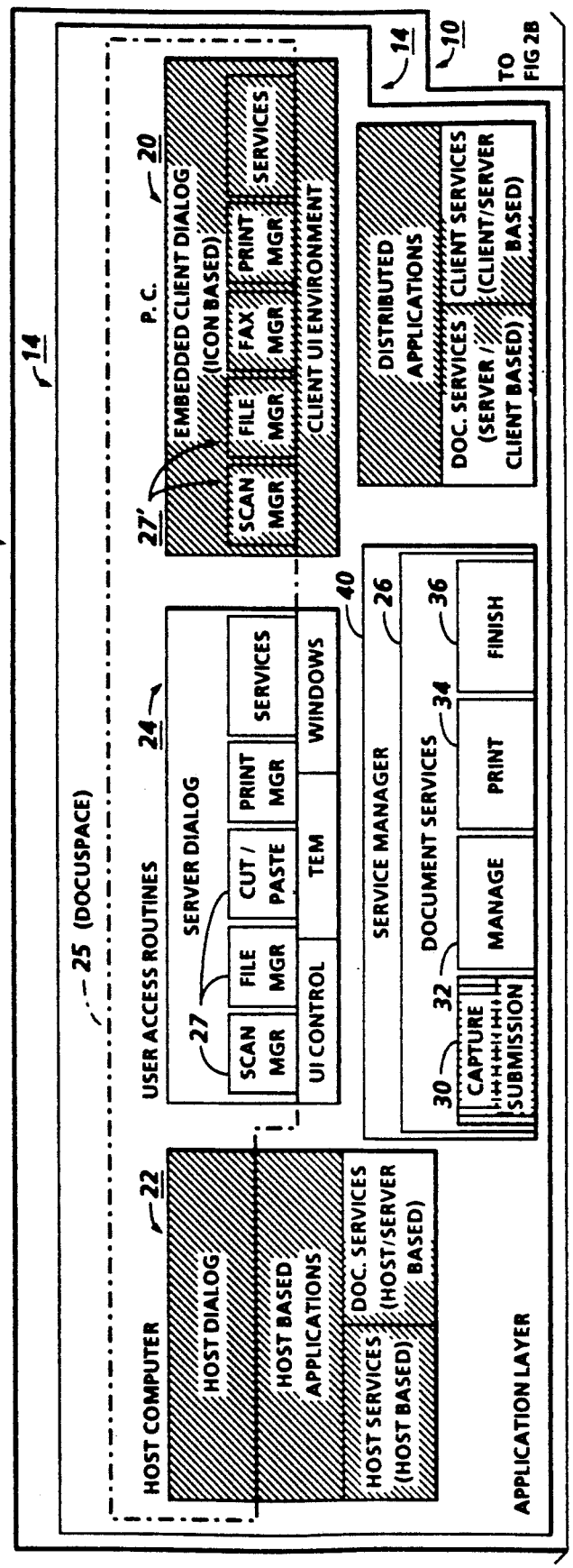

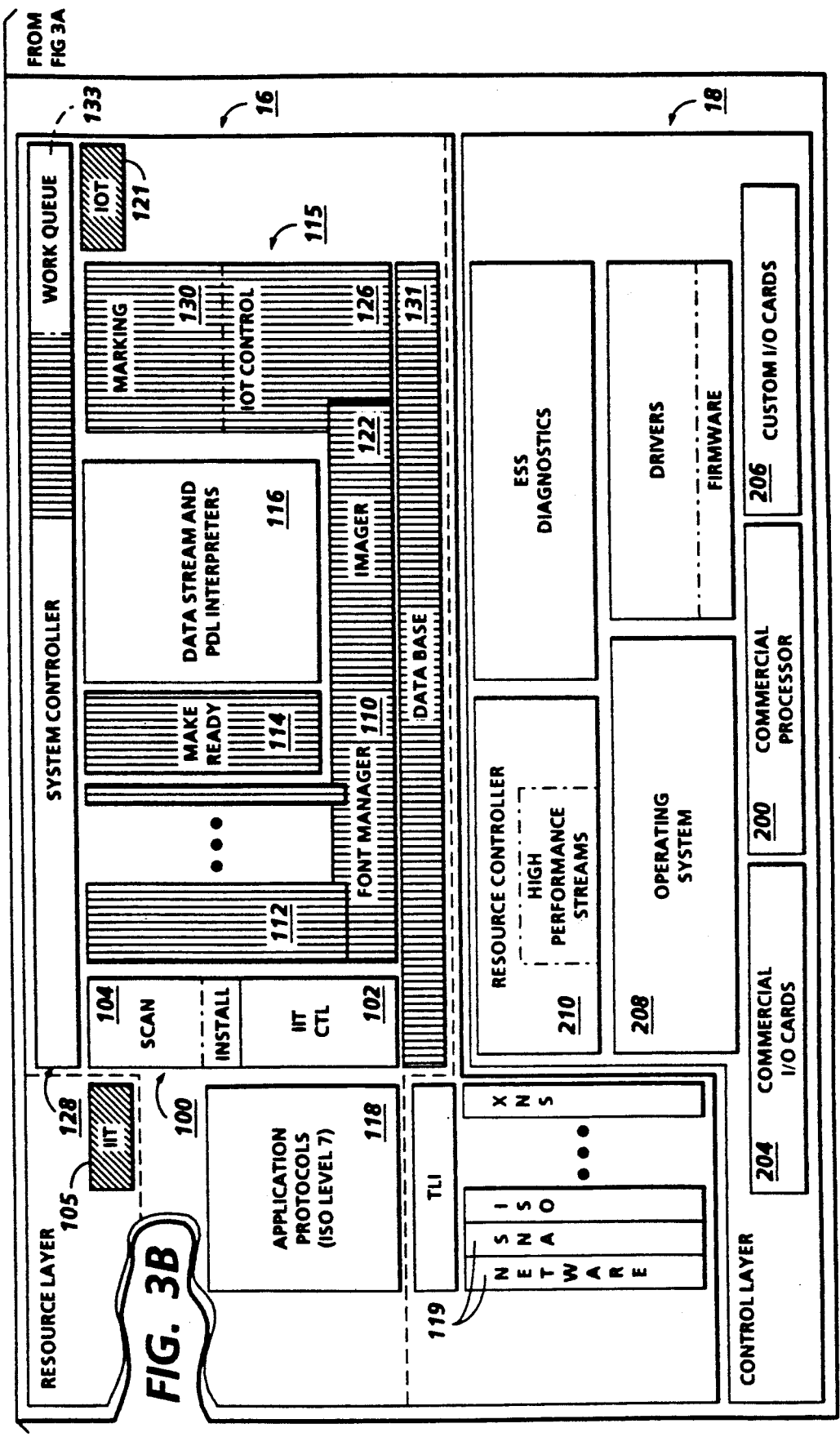

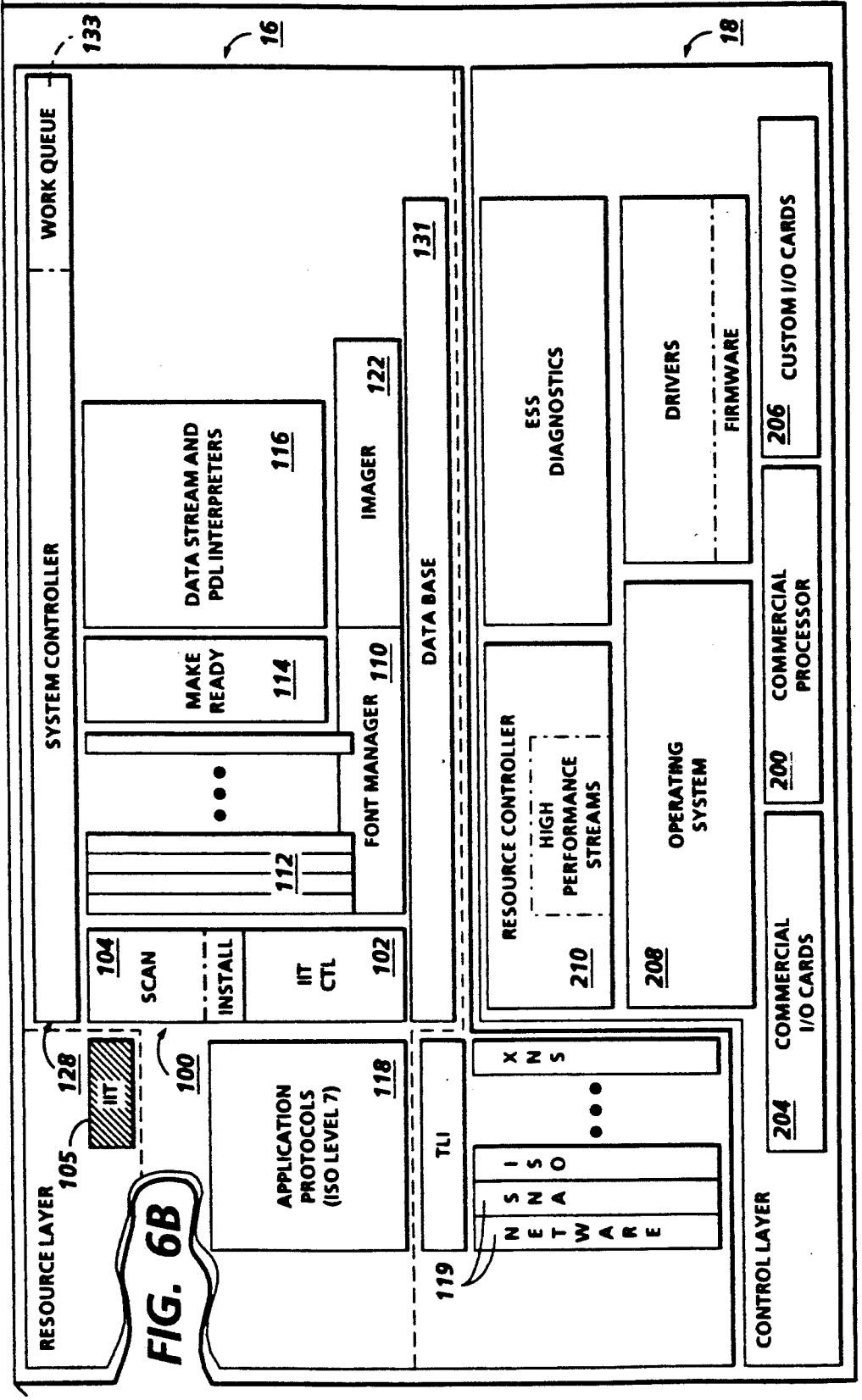

DOCUMENT SERVICES ARCHITECTURE

The invention relates to electronic printing systems, and more particularly, to a document services architecture for electronic printing systems.

In todays document handling and services arena, customers want a family of products that support standard communications and data stream formats, provide a consistent and broad selection of services, and print in a consistent and predictable manner. For the future, customer's needs for document services including document scanning, management, and printing must be meet with a broad range of consistent, cost-effective products.

Such products must be compatible with multiple standard printing environments, print languages, and printer resources such as forms and fonts. They must also seamlessly integrate into the customer's existing network and/or communications facilities. For many customers, this will require support for several different connectivity architectures on a single machine, emulation of other printing environments, and the ability to access services resident on other networked machines, file servers, data bases, and standard customer computing services.

In the prior art, there are numerous patents on the subject of systems. For example, U.S. Pat. No. 4,918,588 to Barrett et al discloses an office automation system with scanner, camera, optical character recognition means, printer, disk storage, computer, image traffic controllers and telecommunication lines for integrated image management. And, U.S. Pat. No. 4,190,350 to Donohue et al, discloses a distributed system for a copier/duplicator with master controller and plural area controllers, one or more of which is smart. Further, there are prior art disclosures to various terminal configurations such as U.S. Pat. No. 4,587,633 to Wang et al which discloses a management communication terminal system with scanning camera, personal computer, telecommunication controller, CRT monitor, and raster printer for use in an office information system. Also, U.S. Pat. No. 4,348,739 to Deaver et al, which discloses a terminal for connection to a data communication system for supplying data to an output printer or display. And, there are disclosures in the prior art to controllers for image processors such as U.S. Pat. No. 4,811,052 to Yamakawa et al which discloses a control device for an imaging processing apparatus using a plurality of operation control units coupled to a central processing unit.

In contrast, the present invention provides a layered document services architecture facilitating operation and interconnection of electronic printing systems with both resident and non-resident work inputs, comprising: a resource layer providing a series of discrete modules and facilities for processing work; an application layer for enabling input of work from both resident and non-resident sources including a document services section and a service manager for coordinating and controlling access to the modules and facilities of the resource layer; and a control layer providing an operating system for coupling the service manager and facilities together in an operating environment, the control layer including a resource controller for prioritizing and distributing system resources to facilities in accordance with program inputs and system operating conditions.

IN THE DRAWINGS

FIGS. 2A and 2B are schematic block diagrams highlighting the particular elements of the document services architecture of FIGS. 1A and 1B corresponding to the capture services;

FIGS. 3A and 3B are schematic block diagrams highlighting the particular elements of the document services architecture of FIGS. 1A and 1B corresponding to the printing services;

Figure 1A:
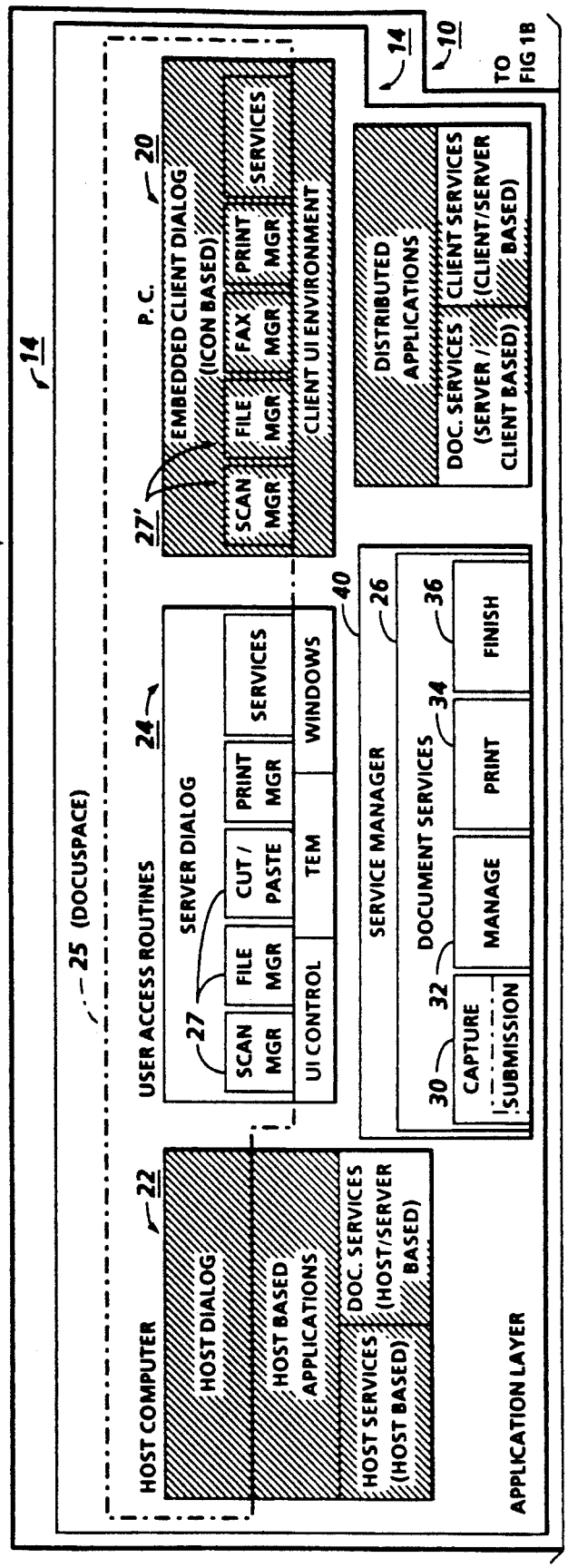
FIGS. 1A and 1B are schematic block diagrams showing the layered document services architecture of the present invention incorporating both resident and non-resident server modules and facilities.
Figure 1B:
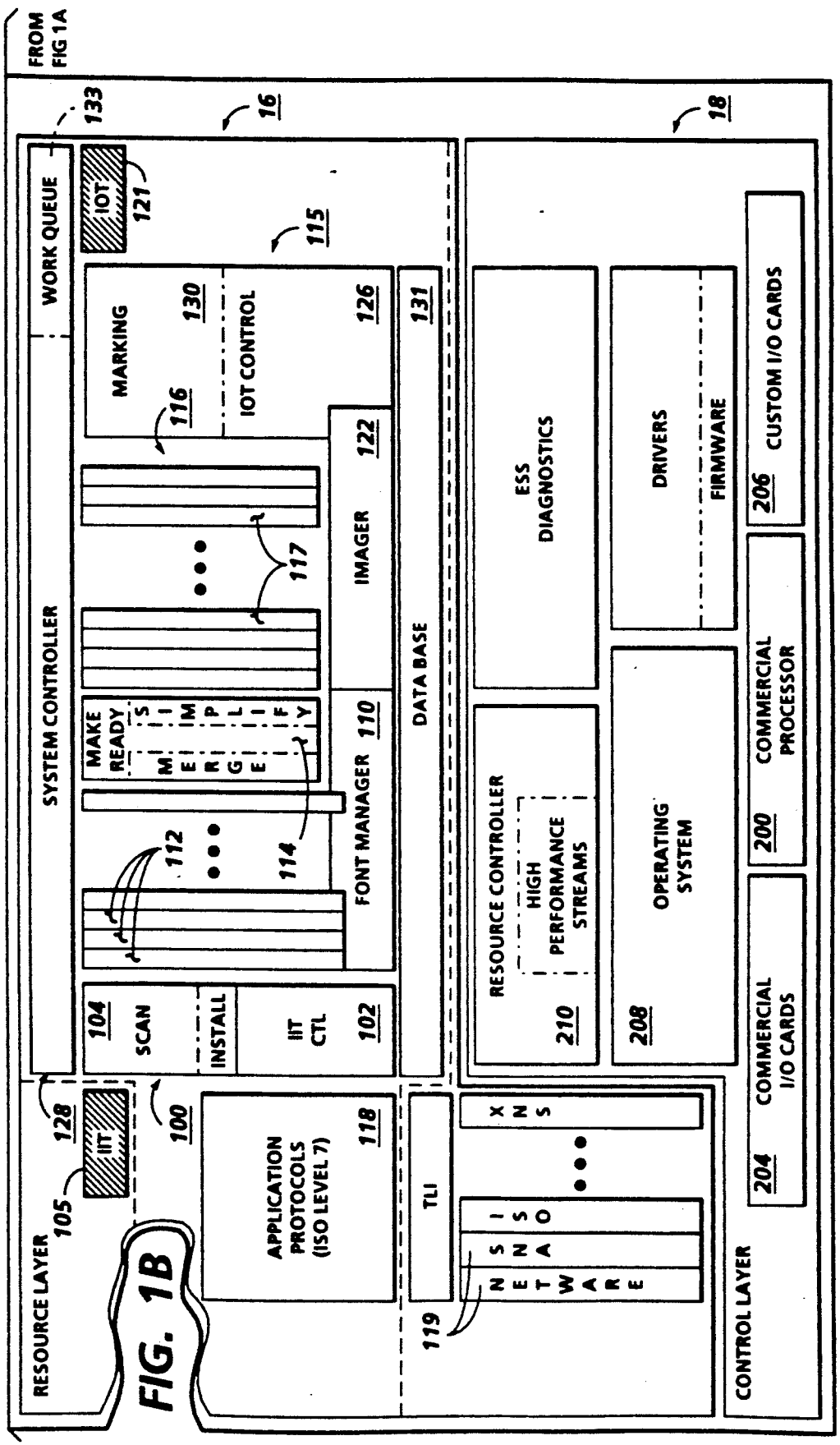
Figure 6A:
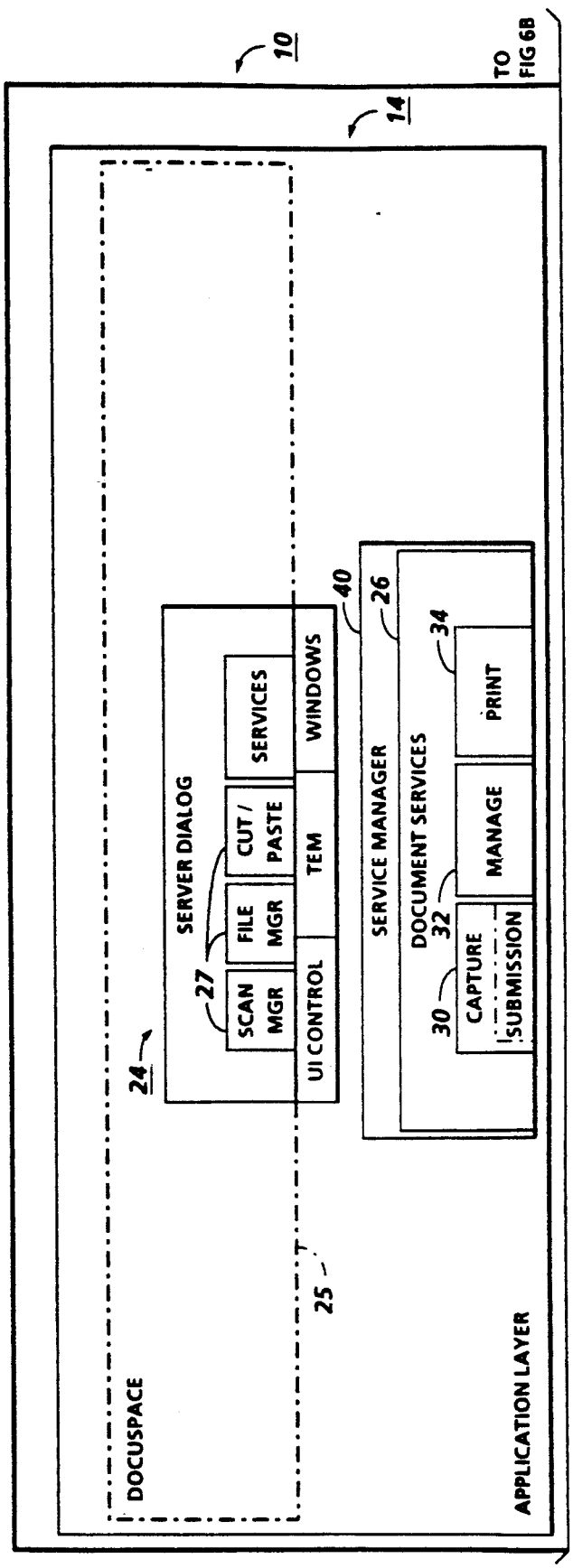
Figure 7A:
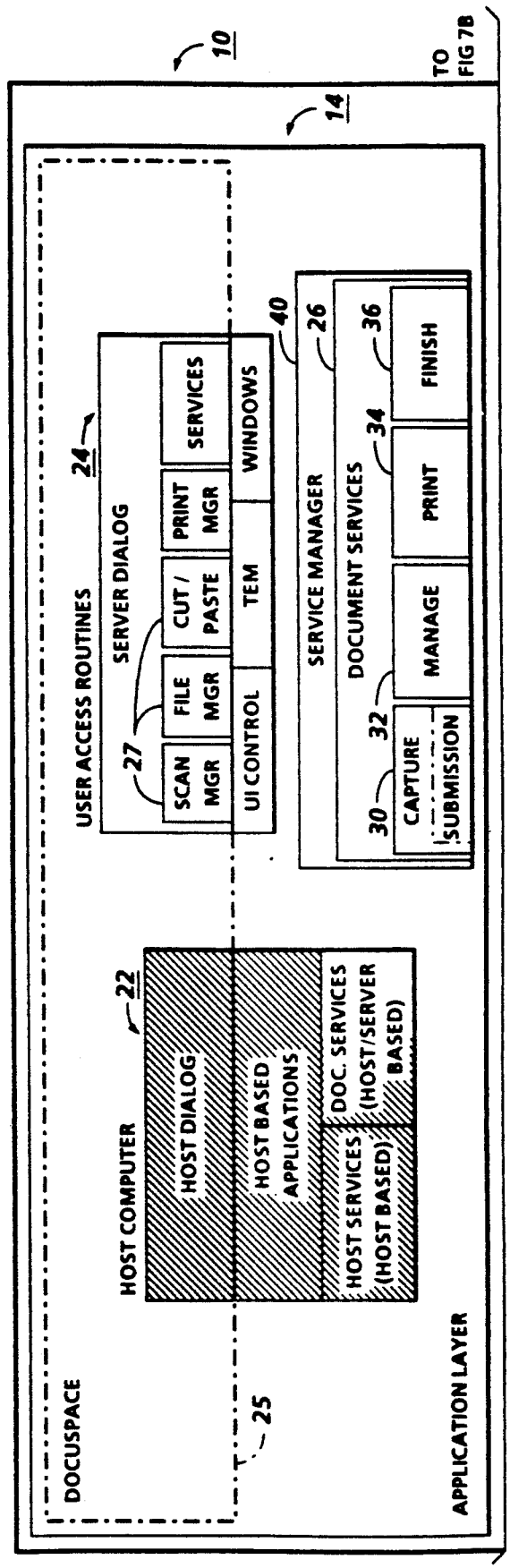
Figure 7B:
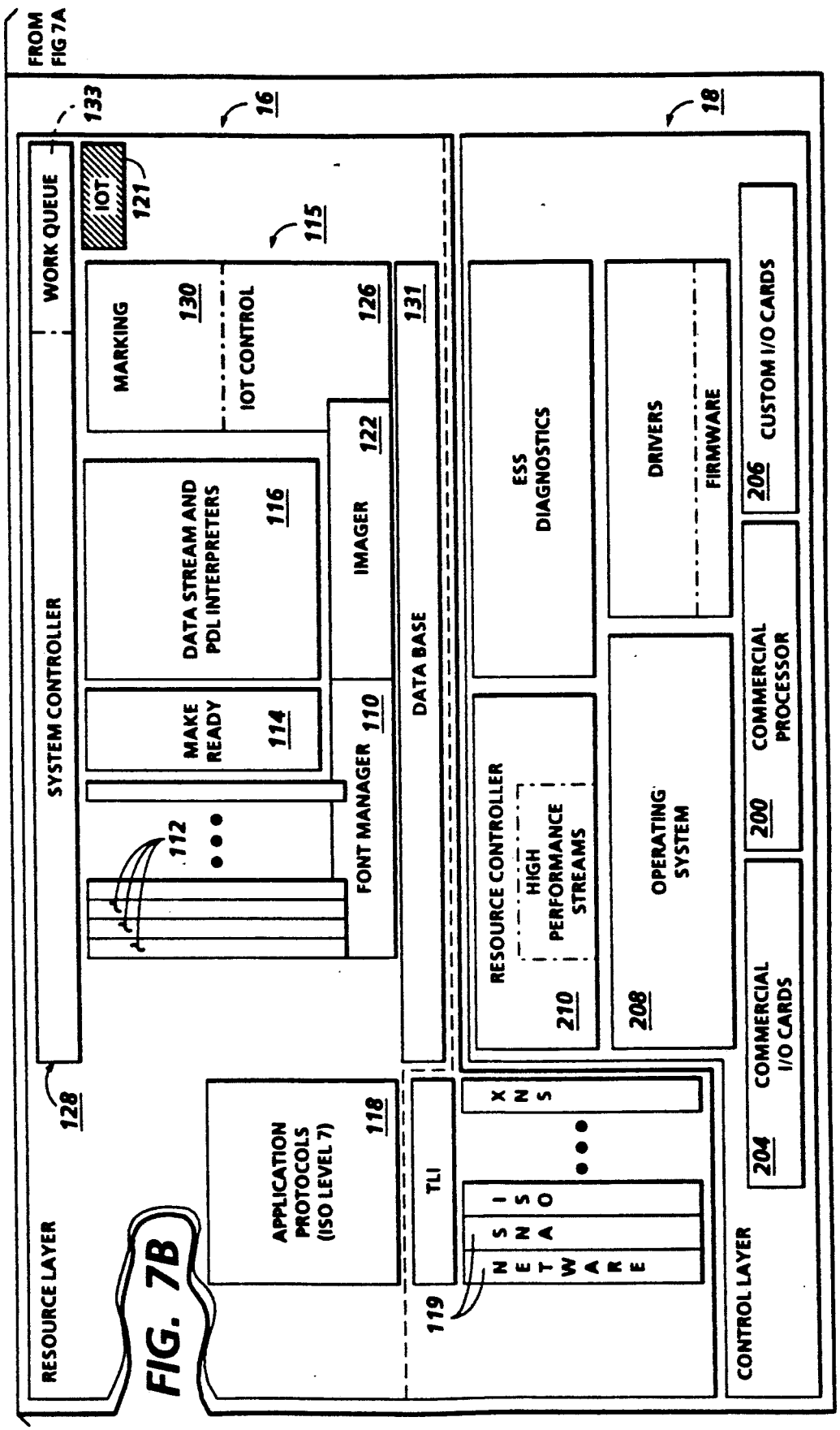

FIGS. 6A and 6B are schematic block diagrams showing a first alternate embodiment of the document services architecture of FIGS. 1A and 1B corresponding to a capture and make ready service accessed directly through its resident dialog; and FIGS. 7A and 7B are a schematic block diagrams showing a second alternate embodiment of the document services architecture of FIGS. 1A and 1B corresponding to a network printing service accessed either remotely from a host computer or directly through dialog.

The following related applications, assigned to the same assignee are incorporated by reference herein. "System Reprographic Architecture", Charles P. Holt, Ser. No. 07/590,414, filed Sep. 28, 1990 still pending, "System State Controller For Electronic Image Processing Systems", Patricia A. Prokop et al, Ser. No. 07/591,325, filed Sep. 28, 1990 now U.S. Pat. No. 5,170,340, and "Control For Electronic Image Processing Systems", Irene M. Allen et al, Ser. No. 07/591,324, filed Sep. 28, 1990 now U.S. Pat. No. 5,175,679.

DESCRIPTION OF THE PREFERRED EMBODIMENTS

Referring to FIGS. 1A-5B of the drawings, there is shown the document services architecture 10 of the present invention. Document services architecture 10 is a layered architecture in which the functions performed are grouped into vertically ordered strati, referred to herein as layers.

Document services architecture 10 has three principal layers; namely, an applications layer 14 (FIG. 1A), a resource layer 16, and a control layer 18 (FIG. 1B).

Applications layer 14 enables access to a defined set of document services from either a remote workstation such as a Personal Computer (PC) 20 or host computer 22, or user access routines (Dialog) 24 resident with the architecture 10. Layer 14 has a document services section 26 which cooperates with the modules and facilities of resource layer 16 to provide the document services offered by the architecture. Document services section 26 includes capture service 30, management service 32, printing service 34, and finishing service 36. Layer 14 additionally incorporates an overriding service manager 40 that coordinates and controls access to and collaboration between the individual document services provided by service section 26.

Resident user access routines Server (Dialog) 24 provide for interaction with the document services 26 through a defined set of UI descriptions 27 and operation paradigms (services). These UI descriptions 27 include scan manager, file manager, print manager, make ready selections such as cut and paste, and other services as described more fully in the aforecited Holt application for use in inputting work programs. Remote workstations such as PC 20 would also enable access to the aforementioned services via similar UI descriptions 27' when programming work input. This set of UI descriptions and paradigms provide a consistent and spatially independent document management programming and usage model document environment (DocuSpace) 25 that is supported by the rest of the architecture.

Resource layer 16 (FIG. 1B) performs the work described to it by document services section 26 of applications layer 14, and for this purpose has a collected set of software modules and facilities which are capable of being reused, combined, and distributed to provide a variety of services and products.

Resource layer 16 consists of three principal sections: a system controller 128; facilities 100, 116, 119 sequenced by the system controller to carry out the document services called for (i.e., capture 30, management 32, printing 34, finishing 36); and a data base 131 shared by the facilities. Database 131 contains the shared information upon which facilities rely.

Figure 2B:
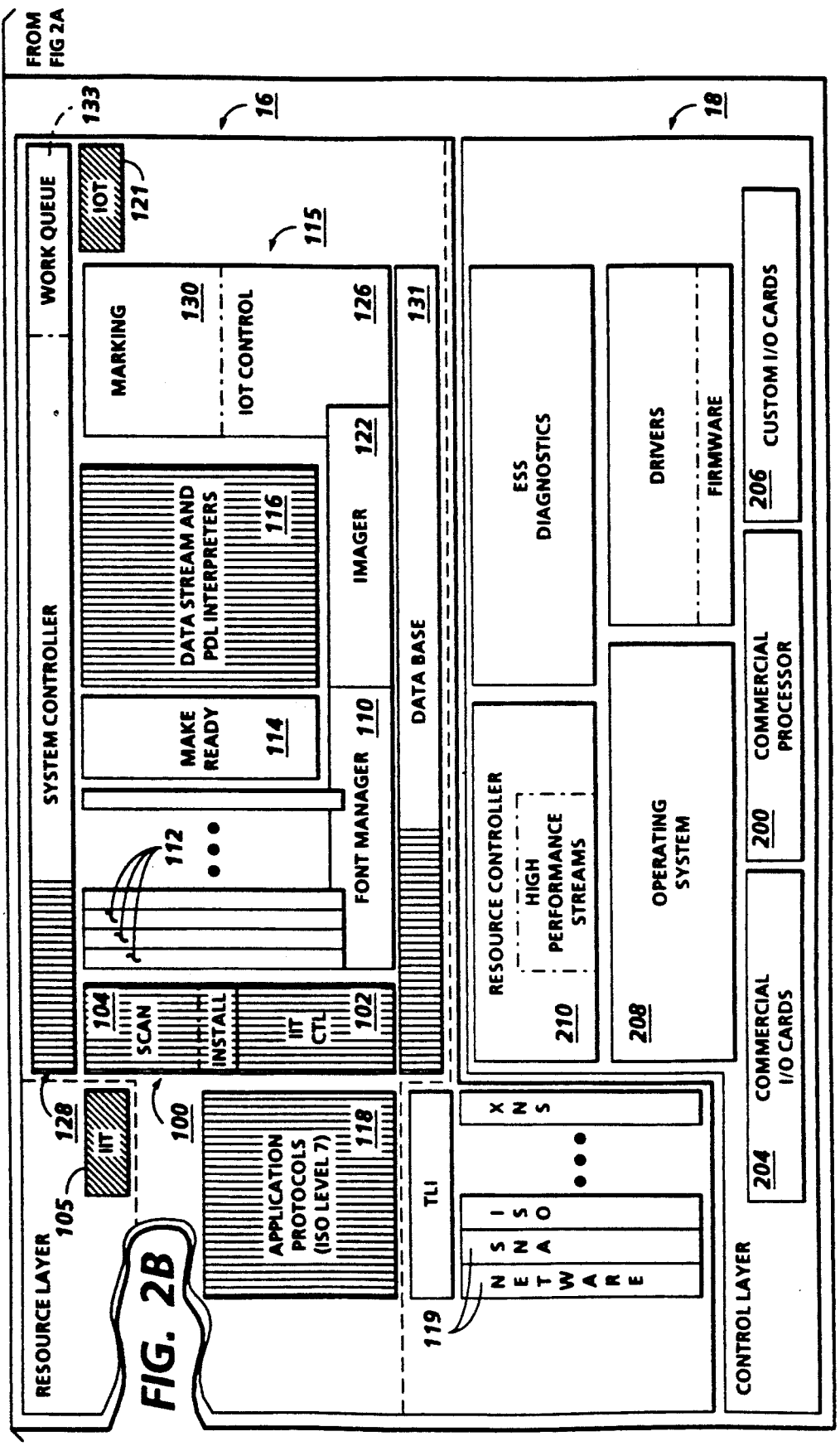

For capture service 30 of application layer 14 and referring particularly to FIGS. 2A and 2B, the facilities in resource layer 16 comprise an image input facility 100, data stream section 116, and application protocols 118. Image input facility has IIT controller 102 and Scan manager 104. IIT controller 102 is to control an attached or remote document scanner 105, and scan manager 104 to capture work in the form of raster (bitmap) image descriptions or documents, or operating instructions in the form of job programming. A data stream section 116 provides various Page Description Language (PDL) and data stream interpreters 117 for a selection of PDL and data stream such as Postcript ™, Interpress, Laser Conditioned Data Stream (LCDS), Xerox ™ Encoding Sequence (XES ™), etc. that are available from the input source data description such as coming from PC 20 or host computer 22. The data stream section 116 captures work in the form of electronic documents, which in turn are logical sequences of page descriptions and associated structure information, or operating instructions, in the form of printing instructions and/or finishing instructions.

Application protocols 118 are standard communication applications appropriate to a document service such as printing, filing, network, name de-referencing, etc. that are available in a variety of communication suites such as Xerox ™ Network Services (XNS ™), International Standards Organization (ISO), etc. The transport protocol stacks 119 have protocol layers 1–6 that represent basic mechanisms for moving data between computing or communicating systems for the variety of communication suites. The architecture provides for a logical separation and automated binding between the Application protocols 118 of resource layer 16 and transport protocol 119 stacks of control layer 18. This allows arbitrary routing and mix and match of the applications to the transport stacks for the various communication suites.

Figure 3A:
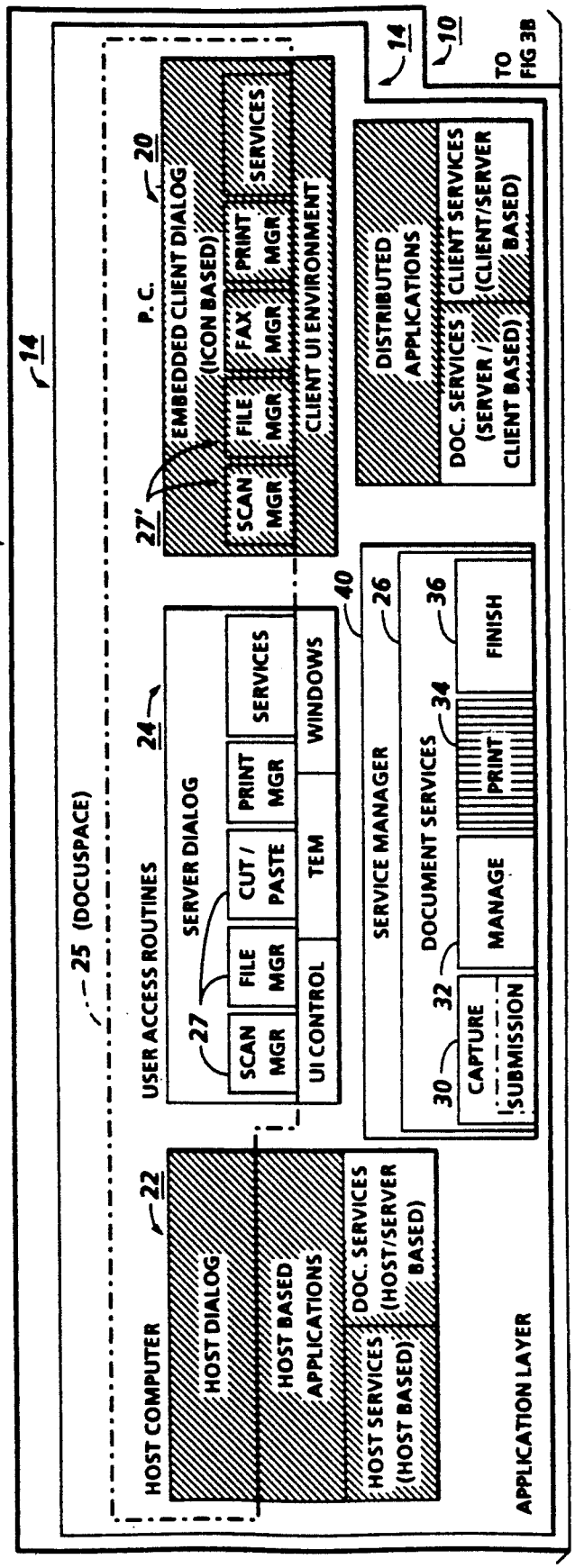

For printing services 34 of application layer 14 and referring particularly to FIGS. 3A and 3B, the facilities provided in layer 16 comprise a font selection library 112, make ready section 114, and imager section 122. Font selection library 112 provides interpreters for various font formats such as FIS, Type I, F3, etc., and a font manager 110 that allows fonts in any format to be used interchangeably. Make ready section 114 supports pre-press and system xerographic operations and provides various service selections and options such as signatures, merge, cut and paste, etc., as noted in the aforecited Holt application.

Imager section 122 performs the necessary manipulation of image or page descriptions obtained via the capture service 30 of layer 14, combining the page descriptions with the data obtained from the font manager 110 or the environment (database) 131 to produce the final form data suitable for use by the Make ready section 114, or suitable for use by Image Output facility 115, or suitable for transmittal to and use directly by an Image Output Terminal (IOT) 121, or suitable for exporting to another system. Having a single shared Imager section 122 that is logically separate from the data stream section 116 allows for consistent imaging across the PDL and data stream interpreters 117, across various Image Output Terminals (IOT) 121 and between systems. A single shared imager 122 also facilitates integration of new interpreters 117 and allows for intermix of PDL and data streams within a document (compound document).

Figure 5A:
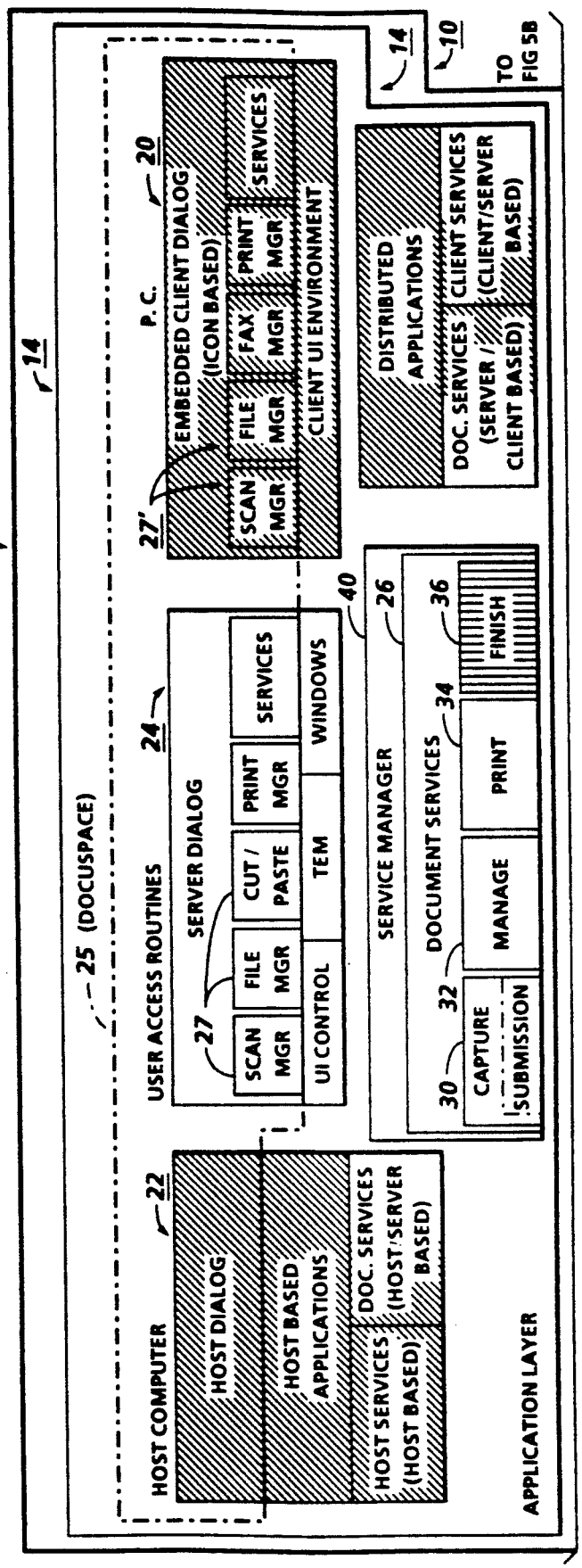
FIGS. 5A and 5B are schematic block diagrams highlighting the particular elements of the document services architecture of FIGS. 1A and 1B corresponding to the finishing services.
Figure 5B:
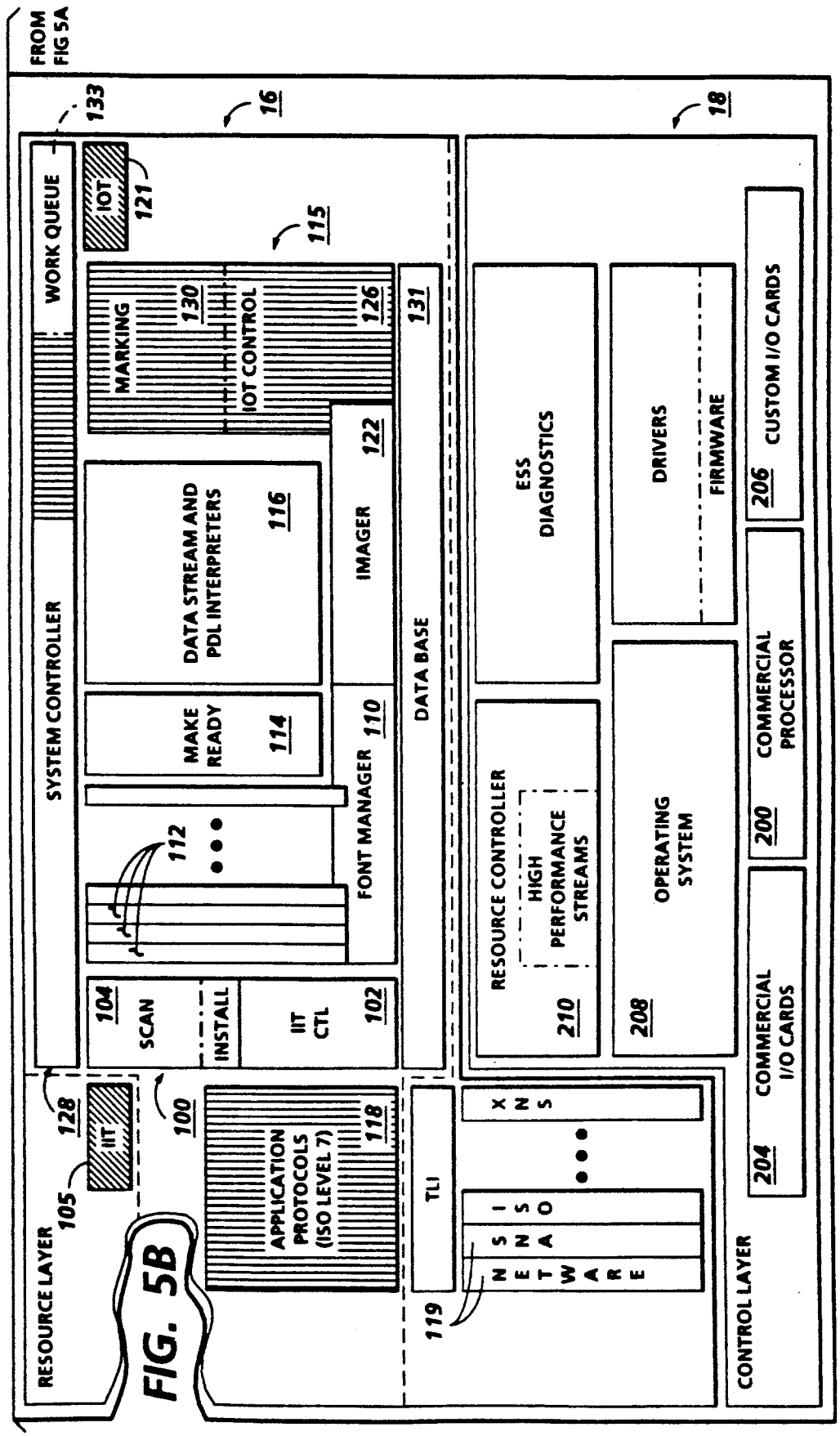

For finishing service 36 and referring particularly to FIGS. 5A and 5B, the image output facility 115 consists of the IOT controller 126 and marker 130. The former is for controlling the attached or remote Image Output Terminal (IOT) 121, the latter for producing the prints (documents) programmed.

The Image Output Terminal (IOT) 121 may be any suitable marking device such as a laser printer, ink jet printer, etc. The IOT 121 may also include finishing facilities such as sorting, stapling, binding, signatures, etc., which are also accessed/managed by the Image Output facility 115, on behalf of the finishing service 36 of document services section 26.

Figure 4A:
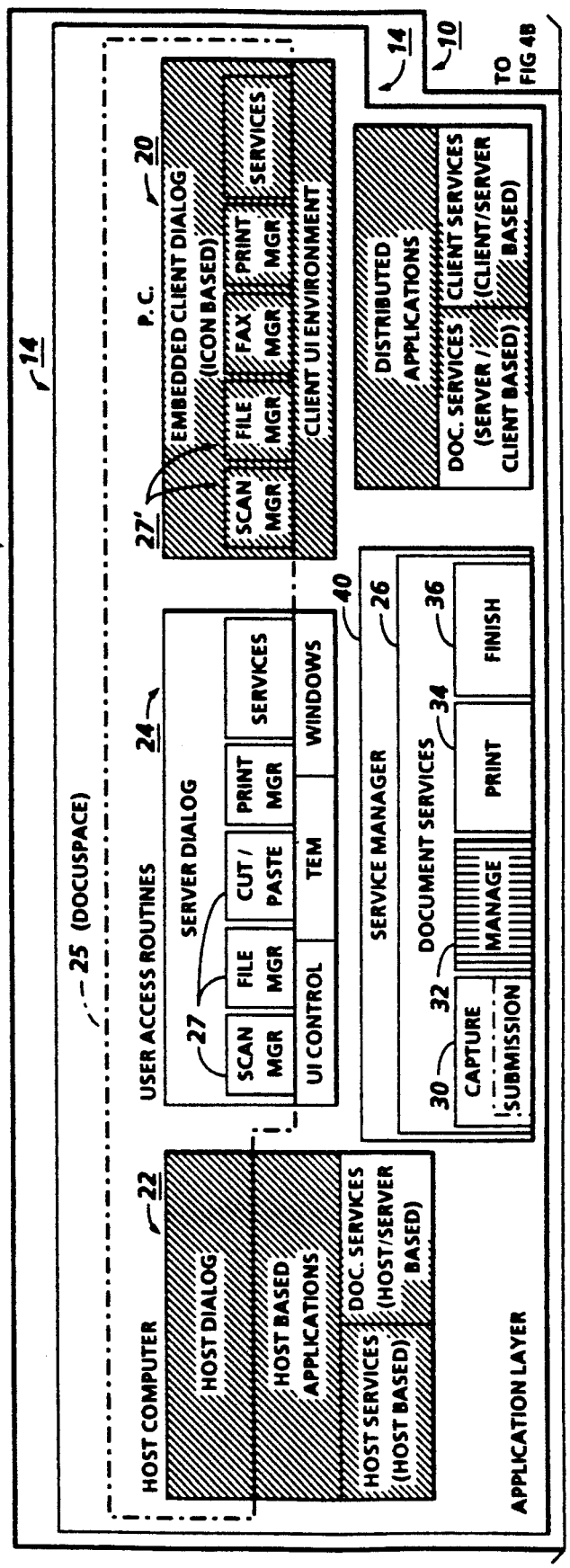
FIGS. 4A and 4B are schematic block diagrams highlighting the particular elements of the document services architecture of FIGS. 1A and 1B corresponding to the management services.
Figure 4B:
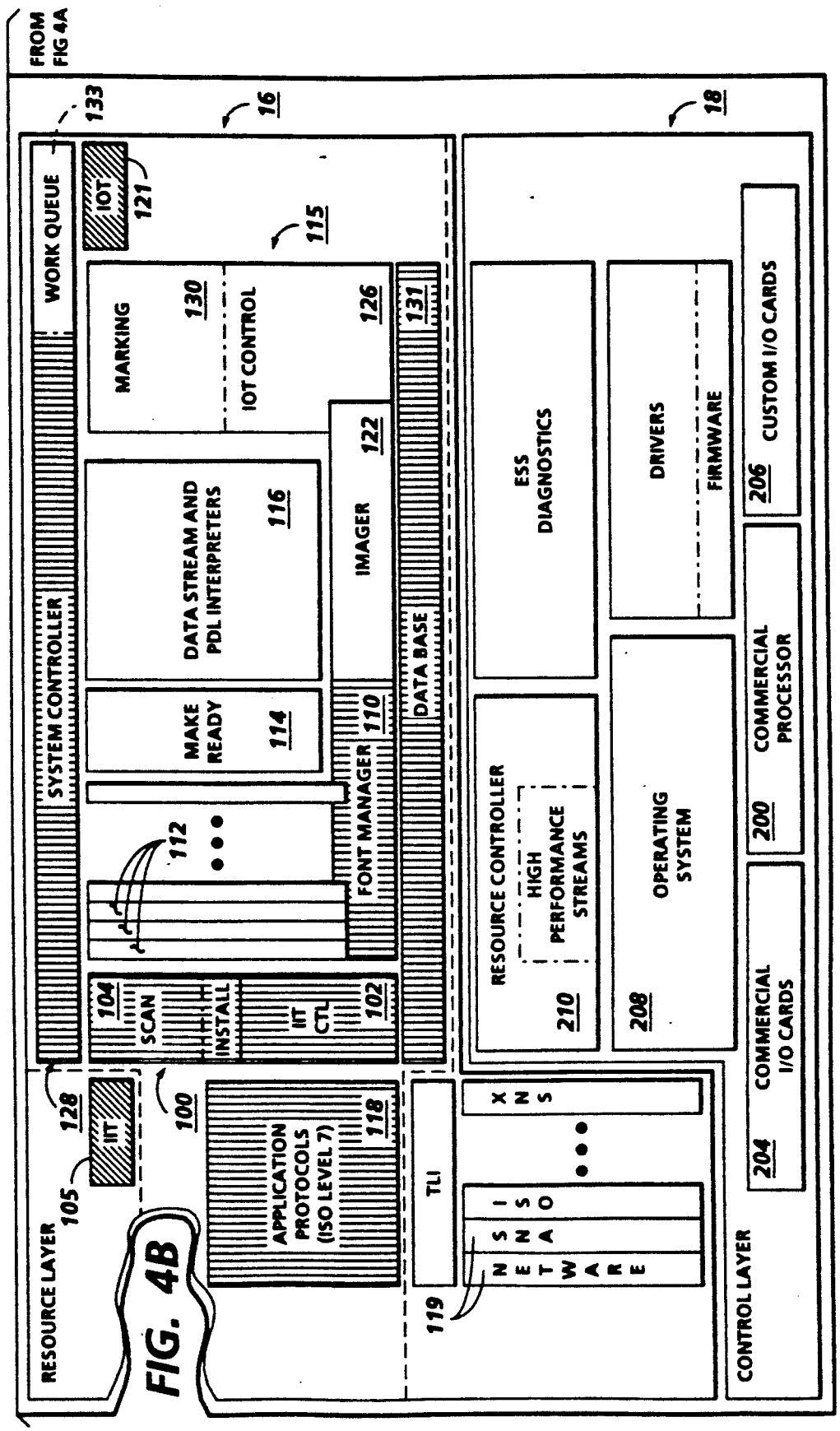

For management service 32 of application layer 14 and referring particularly to FIGS. 4A and 4B, the facilities in the resource layer 16 comprise the system controller 128, applications protocols 118, and font manger 110. System controller 128 provides access to and management of most system resources and database objects directly, while application protocols 118 provides remote access to the management service from either a PC 20 or host computer 22 via standard protocol mechanisms. Font manager 110 provide access to and management of the systems fonts.

Control layer 18 (FIG. 1B) provides a virtual machine for server platforms as described in the aforecited Prokop et al and Allen et al applications, using standard commercial processor platforms 200 and standard and-/or custom I/O cards 204, 206 for processing options. An industry standard operating system 208 such as UNIX ™ is used with special custom supplied extensions to enable real time and multi-processing. Resource controller 210 of layer 18 coordinates bandwidth and resource access between the independent facilities.

System controller 128 of resource layer 16 coordinates operation of the facilities in resource layer 16 to accomplish the service called for, to enable concurrent operation, and to manage the productivity of the system through scheduling of the various facilities in layer 16 in cooperation with a resource controller 210 in control layer 18. Controller 128 controls facility resource management, job management, and the sequencing of job steps, the latter by scheduling the job steps in the work queues 133 of layer 16 associated with the particular facility used.

In the case were an operator decides to scan and print a document, system controller 128 creates a new job as described to it by applications layer 14 mediating with the operator via a remote workstation such as PC 20 or host computer 22, or through user access routines (Dialogs) 24. System controller 128 creates a plan for the job, specifying the various facility sequencing required to carry out the job. A set of priorities for the resources such as I/O bandwidth, physical memory, etc. is planned. To execute the plan, system controller 128 places work requests, representing the job steps, in the work queues 133 of the facilities required to perform the job. When a facility becomes idle, the facility accesses the work queue for that facility and selects the next work request to execute. If necessary due to priorities, control layer 18 redistributes the resources.

System controller 128 formulates a plan for each job similar to an assembly line. In executing the plan, controller 128 places the work requests in the appropriate work queues 133 for the facilities that will perform the work. Each facility draws the work requests from the work queue of the facility, accesses the appropriate database 131, and performs the appropriate operations. When completed, the facility places the results in the appropriate database and notifies system controller 128 that the work is completed.

System controller 128 exercises both general resource control and specific control over the work items by manipulating the work queues. For example, controller 128 may prohibit a facility from taking items from the facility's work queue, thereby freeing resources that would be used by that facility for use by other facilities.

Once a facility has work in the facility's work queue, operating system 208 examines its priorities to decide which facility's work to execute at any given moment. As the job progresses, controller 128 may modify the relative priorities of the facility's work. In the event controller 128 does this, controller 128 notifies resource controller 210 which then parcels out the needed resources accordingly.

In the example, scan section 100 places the image data obtained from scanning in the database 131 and notifies the system controller 128 that scanning is completed. Controller 128 then places a print work item in the print facility's work queue, and the print facility (i.e., marker 130) generates the print output using the scanned in image data from database 133.

In the embodiment shown in FIGS. 6A and 6B, where like numbers refer to like parts, capture service 30 and make ready service 114 are accessed directly through resident user access routines (Dialog) 24. PC 20 and host computer 22 access are not provided nor is selection of print and finishing services 34, 36 respectively. In this embodiment, document scanner 105 serves to capture the work while make ready section 114 supports the necessary pre-press and system xerographic operations.

In the embodiment shown in FIGS. 7A and 7B, where like numbers refer to like parts, the architecture corresponds to a network printing service that is accessed either remotely from host 22 or directly through resident user access routines 24 PC 20 access is not provided in this embodiment.

While the invention has been described with reference to the structure disclosed, it is not confined to the details set forth, but is intended to cover such modifications or changes as may come within the scope of the following claims.

Postcript is a Trademark of Adobe Corporation
Xerox and all Xerox Products referred to herein are Trademarks of Xerox Corporation
UNIX is a Trademark of AT&T Bell Laboratories

We claim:

1. An electronic subsystem for a printing system, the electronic subsystem being responsive to both local and remote inputs and providing a plurality of document related services, comprising:
   a) a resource layer providing a series of discrete modules and facilities for performing document processing related operations;
   b) an application layer for enabling input of the document processing related operations from both the local and remote inputs, including:
      1) a centralized document services section in which a plurality of document processing related services is grouped, said document services section cooperating with said modules and facilities of said resource layer to perform the document processing related operations, and
      2) a service manager for enabling access to said centralized document services section from a selected one of the local and remote inputs and for controlling collaboration between the plurality of document processing related services; and
   c) a control layer providing an operating system for coupling said resource layer and said application layer together in an operating environment, said control layer including a resource controller for prioritizing and distributing use of said resource layer modules and facilities in accordance with program inputs and system operating conditions.

2. An electronic subsystem for a printing system, with the printing system being capable of performing a plurality of document processing related operations inputted thereto from a selected one of a local input and a remote input, comprising:
   a) a resource layer including:
   document processing facilities for aiding in the performance of one of the plurality of document processing related operations, said facilities including:
      an image input facility for capturing image data expressed in one of a plurality of page description languages,
      a plurality of page description language interpreters, one of said page description language interpreters being adapted to interpret the image data from a first form into a second form for output thereof, the one interpreter being selected from said plurality of interpreters to interpret the page description language of the image data captured at said image input facility, and
      means for coordinating operation of said document processing facilities during the performance of the one of the plurality of document processing related operations;
   b) an applications layer including:
   a document services section including a predetermined set of document service selections for accessing selected ones of said document processing facilities to select facilities for document processing;

a dialog service for enabling said document services section to be accessed by the selected one of the local and remote inputs; and a service manager for controlling accessing of said document services section by said dialog service; and c) a control layer including means combining said facilities selected for said document processing to form a virtual machine for carrying out the document processing service selected.

3. The document services architecture of claim 1 in which said remote input comprises a personal computer.

4. The electronic subsystem according to claim 2 in which said image input facility comprises a document scanner for scanning documents to provide said image data, and a controller for controlling said document scanner.

5. The electronic subsystem according to claim 2 in which said document processing facilities include an image output terminal for producing prints from said image data, said centralized document services section including means for selecting said image output terminal.

6. An electronic subsystem for a printing system, with the printing system including a finishing device for finishing prints produced by a printer and being capable of performing a plurality of document processing related operations inputted thereto from a selected one of a local input and a remote input, comprising:

a) a resource layer including:

document processing facilities for aiding in the performance of one of the plurality of document processing related operations, and a controller for coordinating operation of said facilities during the performance of the one of the plurality of document processing related operations;

b) an applications layer including:

a document services section including a predetermined set of document service selections for accessing said document processing facilities to select facilities for document processing, said document services section including means for selecting said finishing device;

a dialog service for enabling said document services section to be accessed from the selected one of the local and remote inputs; and a service manager for controlling accessing of said document services section by said dialog service; and c) a control layer including:

means combining said document processing facilities selected for said document processing to form a virtual machine for carrying out the document processing service selected.

7. The electronic subsystem according to claim 2 in which said image input facility includes data stream means for capturing image data input from said remote input.

8. The electronic subsystem according to claim 2 in which said document processing facilities include an image output terminal for producing prints from said image data, said document services section including means for selecting said image output terminal.

9. The electronic subsystem according to claim 2 in which said document processing facilities include an image output terminal for printing said image data following processing of said image data by said one interpreter.

10. The electronic subsystem according to claim 2 in which said document processing facilities include:

a font interpreting arrangement with a plurality of font formats, and a font manager for controlling said font interpreting arrangement to enable use of different font formats when processing said image data.

11. An electronic subsystem for a printing system, with the printing system being capable of performing a selected set of document processing related operations inputted thereto from a selected one of a local input and a remote input, comprising:

a) a resource layer including:

a selected group of facilities respectively adapted to perform the selected set of document processing related operations, a system state controller for sequencing the order in which the selected set of document processing related operations are to be performed with the selected group of facilities, and a data base for sharing information upon which said selected group of facilities rely in performing the sequenced, selected set of document processing related operations;

b) an applications layer including:

a document services section including a predetermined set of document service selections for accessing said selected group of facilities;

a dialog service for enabling said document services section to be accessed from the selected one of the local and remote inputs; and a service manager for controlling collaboration between said predetermined set of document service selections to perform the selected set of document processing related operations; and a control layer including:

means for combining said selected group of facilities to form a virtual machine for carrying out the selected set of document processing related operations.

12. The electronic subsystem according to claim 1, in which said resource layer includes a plurality of protocols permitting mixing and matching of various communication suites.

* * * * *